Nov. 4, 1952  R. C. HEIDEMAN  2,616,719
CONVERTIBLE BABY CARRIAGE
Filed Jan. 2, 1951  2 SHEETS—SHEET 1

INVENTOR.
ROBERT C. HEIDEMAN
BY
Lyon & Lyon
ATTORNEYS

Nov. 4, 1952　　　　　R. C. HEIDEMAN　　　　　2,616,719
CONVERTIBLE BABY CARRIAGE
Filed Jan. 2, 1951　　　　　　　　　　　　　　2 SHEETS—SHEET 2
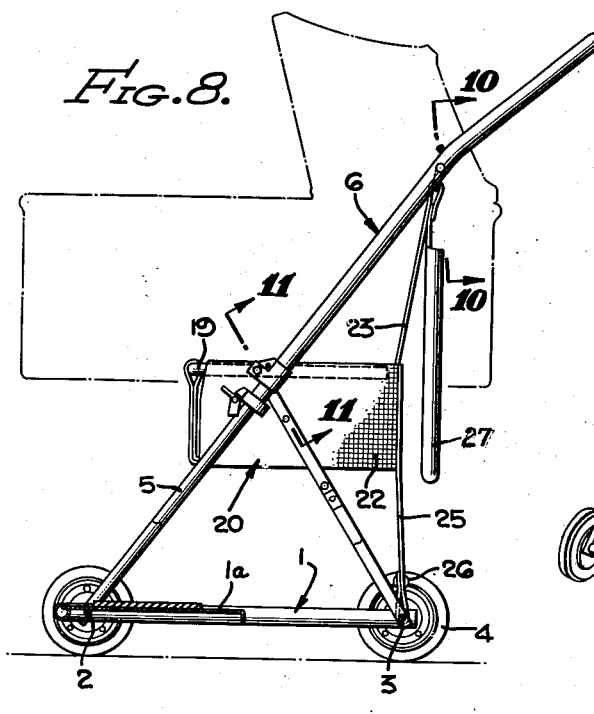
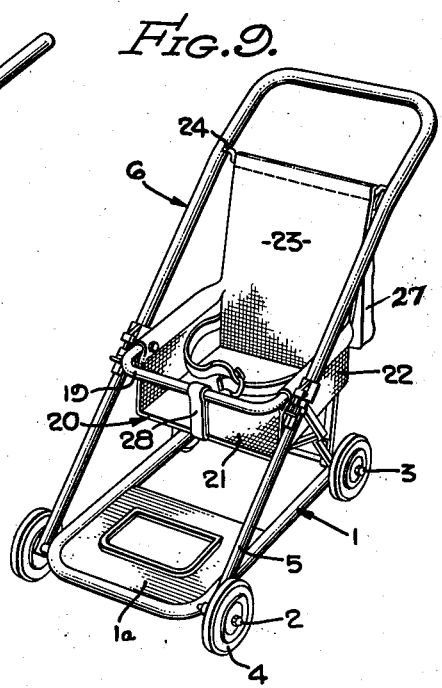
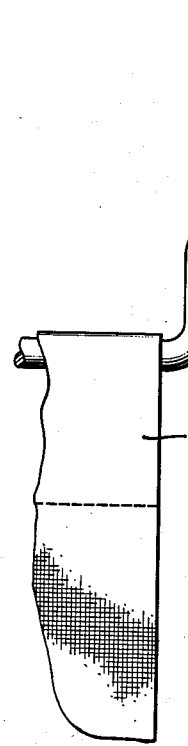
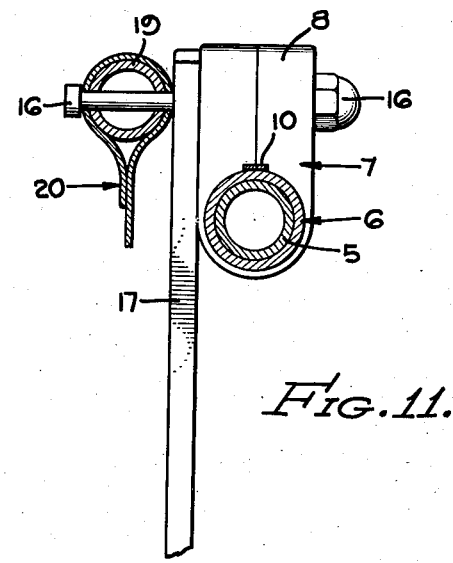
INVENTOR.
ROBERT C. HEIDEMAN
BY
Lyon & Lyon
ATTORNEYS Patented Nov. 4, 1952

2,616,719

UNITED STATES PATENT OFFICE 2,616,719

CONVERTIBLE BABY CARRIAGE

Robert C. Heideman, Los Angeles, Calif., assignor to American Carry-Products Company, Inc., North Hollywood, Calif., a corporation of California Application January 2, 1951, Serial No. 203,978

5 Claims. (Cl. 280—36)

My invention relates to convertible baby carriages, more particularly to a baby carriage which utilizes the frame structure of my baby stroller, described in my copending application, Serial No. 136,004, filed December 30, 1949, whereby with a minimum of effort a stroller seat or carriage body may be interchanged, the present application being a continuation-in-part of said copending application. Among the objects of my invention are:

First, to provide a convertible baby carriage which is readily foldable into a flat structure, even when one is encumbered with a baby in arms.

Second, to provide a convertible baby carriage which is particularly lightweight although of sturdy construction.

Third, to provide a convertible baby carriage which by reason of its interchangeability with a stroller seat makes possible the construction at a minimum cost of a carrier useful for a child from infancy to the age of several years.

With the above and other objects in view as may appear hereinafter, reference is directed to the accompanying drawings in which:

Figure 8 is a side view similar to Figure 1, showing the framework as adapted to use as a baby stroller and indicating by broken lines, the relationship of the carriage structure.

Figure 9 is a perspective view of the frame structure adapted to use with a baby stroller seat.

Figure 10 is an enlarged sectional view through 10—10 of Figure 8.

Figure 11 is an enlarged sectional view through 11—11 of Figure 8.

Figure 1:
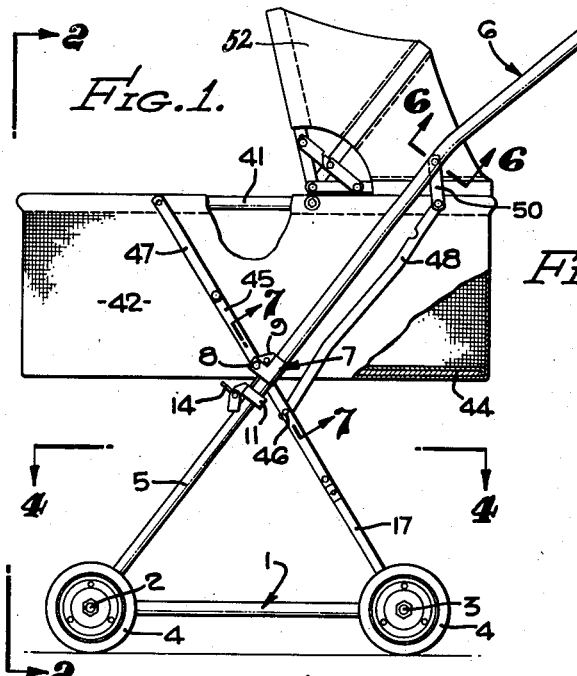
Figure 1 is a side elevational view of my convertible baby carriage.
Figure 2:
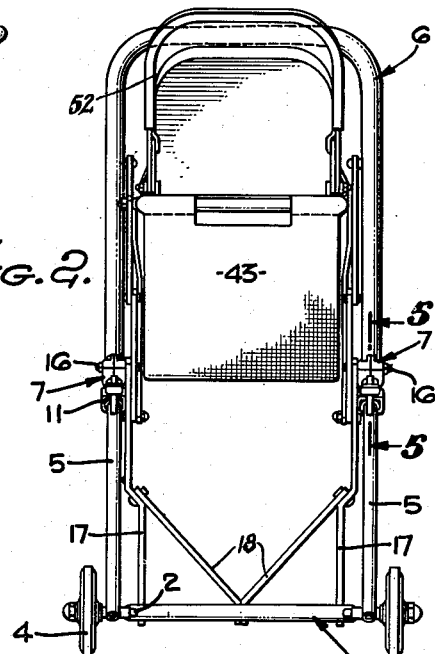
Figure 2 is a front view thereof taken from the line 2—2 of Figure 1.
Figure 3:
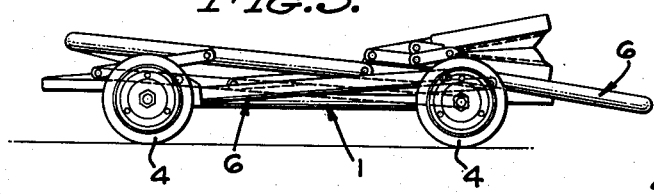
Figure 3 is a view of the baby carriage as it appears when folded.
Figure 7:
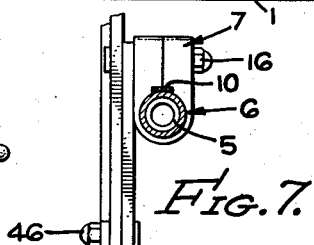
Figure 7 is a fragmentary sectional view through 7—7 of Figure 1, showing the manner in which the carriage structure is supported from the framework.
Figure 4:
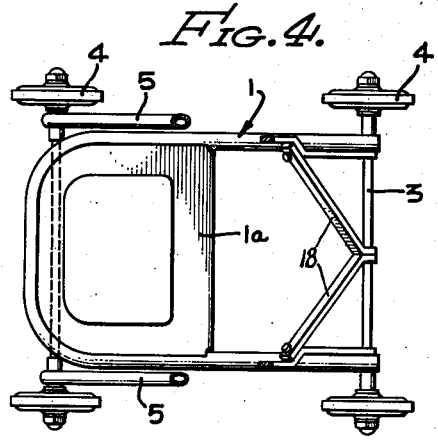
Figure 4 is a sectional view through 4—4 of Figure 1, showing the underframe.
Figure 5:
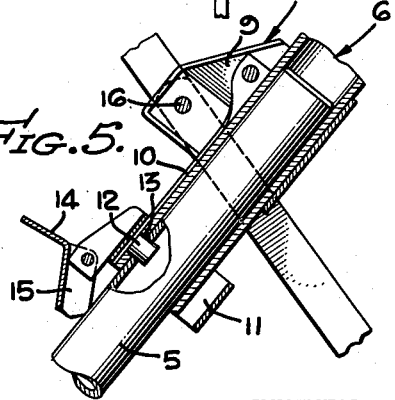
Figure 5 is an enlarged sectional view through 5—5 of Figure 2, showing particularly the telescoping connection between the handle frame and underframe.
Figure 6:
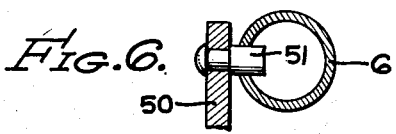
Figure 6 is a fragmentary sectional view through 6—6 of Figure 1, showing the connection between the carriage supporting link and the handle frame.

My convertible baby carriage utilizes the framework of my baby stroller, disclosed in my copending application, identified hereinbefore, and also shown herein in Figures 8 to 11 inclusive. Such framework includes a base frame 1 formed of tubular material and bent into U-form. The legs of the base frame carry a front axle 2 located adjacent the cross portion of the frame and a rear axle 3 located near the extremities of the frame and provided with wheels 4.

The forward portion of the base frame supports a platform 1a.

Pivotally carried by the front axle 2 outwardly of the base frame 1 is a pair of struts 5 which may be solid rods or tubes. The struts 5 telescope into the ends of a tubular U-shaped handle frame 6. At the telescoping extremities of the handle frame 6, there are provided fittings 7. Each fitting is formed from sheet metal and rolled to form a tube or collar encompassing the handle frame, the extremities of the fitting being formed into confronting boss portions 8 reinforced by ribs 9. A leaf spring 10, is secured between the rib portions and protrudes from the fitting, the protruding portion being disposed flatwise relative to the strut 8. The extremity of the leaf spring is provided with a loop member 11 which surrounds the strut 5. An internal pin 12 is provided at the side of the loop joined to the leaf spring, which pin is adapted to enter a socket 13 in the strut to latch the strut in its extended position relative to the handle frame.

A lever 14 is pivotally attached to the loop member. The lever 14 includes a cam arm 15 which engages the strut 5 to lift the pin 12 from its socket 13. The pin is held clear during telescoping movement of the handle frame and strut, but the lever pivots free on extending movement so that the pin automatically engages its socket when the structure is opened.

The boss portions 8 receive removable bolts which serve as journal pins 16 to which are pivotally connected struts 17 which extend rearwardly and are pivotally carried by the rear axle 3, the struts 17 joining the axle immediately within the extremities of the base frame. Brace members 18 extend from the rear axle 3 to the mid-portions of the brace frame. The struts 17 may be bent slightly at their mid-portions so as to facilitate folding the framework.

When used as a baby stroller, the journal pins 16 also support a seat frame 19. The seat frame is a U-shaped tubular structure with the cross portion directed forwardly. The seat frame supports a cloth seat unit 20 which includes a bottom 21 having a rigid reinforcing member therein, and side members 22, provided with hems at their upper extremities into which are inserted the arms of the seat frame 19. The journal pins 16 extend through the material of the side members so that the seat structure is held in place.

The seat structure also includes a back member 23 of fabric, the upper end of which is provided with a hem to receive a cross bar 24, the extremities of which are provided with offset journal ends which may be sprung for insertion into holes in the handle frame 9. Attached to the back member 23 are depending anchor straps 25 which are looped around the rear axle 3, and are provided with snaps 26 to facilitate removal.

If desired, a bag 27 may be suspended from the cross bar 25 behind the back member 24.

A retainer strap 28 extends from the central portion of the forward edge of the seat bottom 21 and is looped around the cross portion of the seat frame 19.

To remove the stroller seat unit, the bolts or journal pins 16 are removed, the cross bar 24 is sprung free of the handle frame, and the snaps 26 unfastened. A specially adapted baby carriage unit may now be substituted.

The baby carriage unit includes a tubular frame 41 in the form of a rectangular loop from which depends side members 42 and end members 43 of fabric or fabric-like plastic material. A bottom 44 having suitable reinforcing is suspended from the side and end members.

Secured to the fittings by the bolts or journals 16 in place of the stroller seat frame are extension bars 45, the bars are immobilized relative to the struts 17 by bolts 46 extending through the struts a short distance below the journals 16. The bars 45 extend, when carriage is open, upwardly and forwardly and are hinged to link bars 47 which are pivotally attached to the sides of the carriage frame 41 somewhat forwardly of their midpoints.

Pivotally mounted by the bolts 46 are struts 48 which, when the carriage is open, extend upwardly and rearwardly in substantial parallelism with the handle frame 49. The extremities of the struts 48 are pivotally connected to the sides of the handle frame 6. Also connected at these points are short links 50 which have lateral pins 51 in their extremities which fit in the holes in the handle frame which also receive the ends of the cross bar 24.

The carriage unit is provided at one end with a foldable hood 52 attached to the frame 41.

The main frame structure common to the stroller unit and the carriage unit folds or opens in the same manner irrespective of which unit is installed. That is, to fold, the pins 13 are withdrawn either simultaneously or one at a time by operation of levers 14. The handle frame is then pushed downward, causing the struts to telescope therein.

It will be observed that although the stroller unit and carriage unit are mounted at different levels in accordance with their respective uses, that both units fold flatwise automatically with telescoping of the struts 5 and handle frame 6.

Having fully described my invention, it is to be understood that I do not wish to be limited to the details herein set forth, but my invention is of the full scope of the appended claims.

I claim:

1. A baby carriage, involving: a base frame; a longitudinally collapsible handle frame pivotally connected to the forward end of said base frame; struts pivotally connected between the rear end of said base frame and the mid-portion of said handle frame and extensions for said struts projecting upwardly and forwardly of said mid-portion; a carriage unit including a rectangular frame and a collapsible body depending therefrom; link members connecting said carriage frame with said extensions and said handle frame; said base frame, handle frame and struts movable between a collapsed position of substantial parallelism and an extended angular position, said link members movable to maintain said carriage frame in approximate parallelism with said base frame between a raised position and a collapsed position.

2. A baby carriage, involving: a frame structure including a base frame, forward and rearward struts pivotally connected thereto, a handle frame telescopically connected with said forward struts, and fittings pivotally connecting said rear struts and handle frame at its telescoping extremities whereby said frame structure may be folded with said frames and struts in substantial parallelism and extended with said struts and base frame defining a triangle, said handle when extended projecting upwardly and rearwardly in approximately the plane of said forward struts; a carriage structure including a rectangular frame and a collapsible body depending therefrom; and support means connecting said carriage structure to said fittings and to said handle frame, said support means being so proportioned relative to said frame structure as to cause said carriage frame to move in approximate parallelism with said base frame between a contiguous collapsed position and a raised position, simultaneously with collapsing and extending said frame structure.

3. A baby carriage, involving: a frame structure including a base frame, forward and rearward struts pivotally connected thereto, a handle frame telescopically connected with said forward struts, and fittings pivotally connecting said rear struts and handle frame at its telescoping extremities whereby said frame structure may be folded with said frames and struts in substantial parallelism and extended with said struts and base frame defining a triangle, said handle when extended projecting upwardly and rearwardly in approximately the plane of said forward struts; a carriage structure including a rectangular frame and a collapsible body depending therefrom; a folding forward link extending from the region of each fitting; a rearward oscillating link and arm structure pivotally connected to each rear strut and to said handle frame; and pivotal connecting means between said forward and rearward links and said carriage frame, said carriage frame movable on collapsing of said frame structure between an extended position parallel with said base frame to a contiguous also substantially parallel position relative thereto.

4. A baby carriage, involving: a frame structure including a base frame, forward and rearward struts pivotally connected thereto to form triangular truss units, a pivotal and slidable connecting means joining said struts and including latch means to retain said truss units against collapse; a handle means extending from said frame structure; a carriage structure including a rectangular frame and a collapsible body depending therefrom; and support means connecting said carriage frame to said frame structure and said handle, to cause said carriage frame to move in approximate parallelism with said base frame as said truss units are extended or collapsed.

5. A baby carriage, involving: a frame structure including a base frame, forward and rearward struts pivotally connected thereto to form triangular truss units, a pivotal and slidable connecting means joining said struts and including latch means to retain said truss units against collapse; a handle means extending from said frame structure; a carriage structure including a rectangular frame and a collapsible body depending therefrom; forward support means extending from the region of said latch means; and rearward support means extending from said handle, said support means being connected with said carriage frame and proportioned to secure said carriage frame in elevated parallelism with said base frame and also in contiguous parallelism therewith, when said truss units are respectively extended and collapsed.

ROBERT C. HEIDEMAN.

REFERENCES CITED

The following references are of record in the file of this patent:

UNITED STATES PATENTS

| Number | Name | Date |
| --- | --- | --- |
| D. 157,085 | Pinkerton | Jan. 31, 1950 |
| 2,452,929 | Holcomb | Nov. 2, 1948 |
| 2,567,464 | Bancroft | Sept. 11, 1951 |

FOREIGN PATENTS

| Number | Country | Date |
| --- | --- | --- |
| 266,536 | Switzerland | June 16, 1950 |